United States Patent
Cheeran et al.

(10) Patent No.: US 10,839,338 B2
(45) Date of Patent: Nov. 17, 2020

(54) ORDER SOURCING WITH ASYNCHRONOUS COMMUNICATION AND USING OPTIMIZATION FOR LARGE SOURCING NETWORKS

(71) Applicant: International Business Machines Corporation, Armonk, NY (US)

(72) Inventors: Sanjay E. Cheeran, Plano, TX (US); Ajay A. Deshpande, White Plain, NY (US); Saurabh Gupta, Irving, TX (US); Arun Hampapur, Norwalk, CT (US); Steve Igrejas, Nashua, NH (US); Ali Koc, White Plains, NY (US); Pradyumnha G. Kowlani, Foster City, CA (US); Yingjie Li, Chappaqua, NY (US); Ding Ding Lin, Beijing (CN); Xuan Liu, Yorktown Heights, NY (US); Christopher S. Milite, Oxford, CT (US); Brian L. Quanz, Yorktown Heights, NY (US); Vadiraja S. Ramamurthy, Allen, TX (US); Sachin Sethiya, Billerica, MA (US); Chek Keong Tan, Danbury, CT (US); Dahai Xing, White Plains, NY (US); Michael Yesudas, Plano, TX (US); Xiaobo Zheng, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 1065 days.

(21) Appl. No.: 15/154,007

(22) Filed: May 13, 2016

(65) Prior Publication Data
US 2017/0206481 A1    Jul. 20, 2017

Related U.S. Application Data

(60) Provisional application No. 62/279,738, filed on Jan. 16, 2016.

(51) Int. Cl.
*G06Q 10/08* (2012.01)
*G06Q 30/02* (2012.01)
*G06N 20/00* (2019.01)
*G06F 16/14* (2019.01)
(Continued)

(52) U.S. Cl.
CPC ..... *G06Q 10/08345* (2013.01); *G06F 3/0482* (2013.01); *G06F 3/04847* (2013.01);
(Continued)

(58) Field of Classification Search
CPC ......... G06Q 10/08345; G06Q 30/0284; G06Q 30/0635; G06Q 10/06315; G06Q 10/0633;
(Continued)

(56) References Cited

U.S. PATENT DOCUMENTS 6,826,473 B1 * 11/2004 Burch .................... G01C 21/20
                                                            342/357.46
7,050,938 B1    5/2006 Prater et al.
(Continued)

FOREIGN PATENT DOCUMENTS

WO    2005/067434 A2    7/2005

OTHER PUBLICATIONS

Yin-Yann Chen. The order fulfillment planning problem considering multi-site order allocation and single-site shop floor scheduling. J Intell Manuf (2014) 25:441-458.*
(Continued)

*Primary Examiner* — Timothy Padot
(74) *Attorney, Agent, or Firm* — Scully, Scott, Murphy & Presser, P.C.; Joseph Petrokaitis

(57) ABSTRACT

A predictive engine on a computer environment comprising a shared pool of configurable computing resources is executed to perform a predictive analysis on data pipelined into the computer environment, the data received from a plurality of sources and in a plurality of different formats,
(Continued)

the predictive engine generating a network level cost information based on the predictive analysis on a dynamic and continuous basis. Asynchronous communication comprising the network level cost information from the predictive engine is received and a set of candidate nodes for order fulfillment is generated based on the network level cost information and a defined distance between the set of candidate nodes and a target destination. An optimization engine on the computer environment is invoked that filters the set of candidate nodes. A number of fulfillment nodes that meet one or more of a constraint and preconfigured rule is output.

20 Claims, 4 Drawing Sheets

(51) Int. Cl.
| | | |
|---|---|---|
| *G06F 16/182* | (2019.01) | |
| *G06F 16/17* | (2019.01) | |
| *G06F 16/23* | (2019.01) | |
| *G06N 5/00* | (2006.01) | |
| *G06F 3/0482* | (2013.01) | |
| *G06F 3/0484* | (2013.01) | |
| *G06Q 30/06* | (2012.01) | |
| *H04L 12/26* | (2006.01) | |
| *G06N 5/04* | (2006.01) | |
| *G06Q 10/06* | (2012.01) | |

(52) U.S. Cl.
CPC ........ *G06F 16/148* (2019.01); *G06F 16/1734* (2019.01); *G06F 16/183* (2019.01); *G06F 16/1844* (2019.01); *G06F 16/2365* (2019.01); *G06N 5/003* (2013.01); *G06N 5/04* (2013.01); *G06N 5/045* (2013.01); *G06N 20/00* (2019.01); *G06Q 10/0633* (2013.01); *G06Q 10/06315* (2013.01); *G06Q 10/06375* (2013.01); *G06Q 10/083* (2013.01); *G06Q 10/087* (2013.01); *G06Q 10/0833* (2013.01); *G06Q 10/0838* (2013.01); *G06Q 10/0875* (2013.01); *G06Q 30/0201* (2013.01); *G06Q 30/0206* (2013.01); *G06Q 30/0283* (2013.01); *G06Q 30/0284* (2013.01); *G06Q 30/0635* (2013.01); *H04L 43/0882* (2013.01); *H04L 43/16* (2013.01); *H04L 43/0876* (2013.01)

(58) Field of Classification Search
CPC ........... G06Q 10/06375; G06Q 10/083; G06Q 10/0833; G06Q 10/0838; G06Q 10/087; G06Q 10/0875; G06Q 30/0201; G06Q 30/0206; G06Q 30/0283; G06F 16/1844; G06F 16/183; G06F 16/148; G06F 16/2365; G06F 16/1734; G06F 3/0482; G06F 3/04847; G06N 20/00; G06N 5/003; G06N 5/04; G06N 5/045; H04L 43/0882; H04L 43/16; H04L 43/0876
USPC ...................................................... 705/7.25
See application file for complete search history.

(56) References Cited

U.S. PATENT DOCUMENTS

| | | | |
|---|---|---|---|
| 7,295,990 B1 * | 11/2007 | Braumoeller | G06Q 10/063 |
| | | | 705/7.31 |
| 7,370,005 B1 | 5/2008 | Ham et al. | |
| 7,747,543 B1 * | 6/2010 | Braumoeller | G06Q 10/0833 |
| | | | 705/330 |
| 7,848,953 B2 | 12/2010 | Kahlon et al. | |
| 7,917,387 B2 | 3/2011 | Spurr et al. | |
| 7,966,207 B2 | 6/2011 | Altice et al. | |
| 8,015,081 B1 | 9/2011 | Franco | |
| 8,065,172 B2 | 11/2011 | Mauthe et al. | |
| 8,204,799 B1 | 6/2012 | Murray et al. | |
| 8,249,917 B1 * | 8/2012 | Kassmann | G06Q 30/0601 |
| | | | 705/12 |
| 8,352,382 B1 | 1/2013 | Katta et al. | |
| 8,374,922 B1 * | 2/2013 | Antony | G06Q 30/00 |
| | | | 705/26.81 |
| 8,428,988 B1 | 4/2013 | Braumoeller et al. | |
| 8,498,888 B1 * | 7/2013 | Raff | G06Q 10/087 |
| | | | 705/7.12 |
| 8,577,733 B2 * | 11/2013 | Atwater | G06Q 10/06 |
| | | | 705/26.1 |
| 8,626,333 B2 | 1/2014 | Waddington et al. | |
| 8,700,443 B1 | 4/2014 | Murray et al. | |
| 8,818,836 B1 | 8/2014 | Braumoeller et al. | |
| 9,063,789 B2 | 6/2015 | Beaty et al. | |
| 9,112,836 B2 | 8/2015 | Ferris | |
| 9,324,048 B2 | 4/2016 | Ptak et al. | |
| 9,940,603 B1 | 4/2018 | Caven et al. | |
| 10,009,251 B1 | 6/2018 | Koster et al. | |
| 2002/0032573 A1 | 3/2002 | Williams et al. | |
| 2002/0156663 A1 | 10/2002 | Weber et al. | |
| 2003/0093388 A1 | 5/2003 | Albright | |
| 2003/0172007 A1 | 9/2003 | Helmolt et al. | |
| 2005/0021995 A1 * | 1/2005 | Lal | G06F 21/10 |
| | | | 726/4 |
| 2005/0144053 A1 * | 6/2005 | Mauthe | G06Q 10/063 |
| | | | 705/7.37 |
| 2006/0112049 A1 | 5/2006 | Mehrotra et al. | |
| 2007/0130201 A1 | 6/2007 | Ratliff et al. | |
| 2009/0282101 A1 * | 11/2009 | Lim | G06F 11/1471 |
| | | | 709/203 |
| 2011/0320469 A1 | 12/2011 | Canessa et al. | |
| 2012/0029974 A1 | 2/2012 | Councill et al. | |
| 2012/0150583 A1 | 6/2012 | Dueck et al. | |
| 2012/0150692 A1 | 6/2012 | Dueck et al. | |
| 2012/0239450 A1 * | 9/2012 | Nudd | G06Q 10/00 |
| | | | 705/7.15 |
| 2013/0166468 A1 | 6/2013 | Vogelgesang et al. | |
| 2013/0326487 A1 | 12/2013 | Yousouf et al. | |
| 2014/0047342 A1 | 2/2014 | Breternitz et al. | |
| 2014/0059226 A1 | 2/2014 | Messerli et al. | |
| 2014/0108474 A1 | 4/2014 | David et al. | |
| 2014/0136255 A1 | 5/2014 | Grabovski et al. | |
| 2014/0143099 A1 | 5/2014 | Wilkins | |
| 2014/0279294 A1 | 9/2014 | Field-Darragh et al. | |
| 2014/0310048 A1 | 10/2014 | Murray et al. | |
| 2014/0337086 A1 | 11/2014 | Asenjo et al. | |
| 2015/0039443 A1 | 2/2015 | Soon-Shiong | |
| 2015/0052019 A1 | 2/2015 | Field-Darraugh et al. | |
| 2015/0112905 A1 | 4/2015 | Miner et al. | |
| 2015/0112906 A1 | 4/2015 | Gauthier et al. | |
| 2015/0127438 A1 | 5/2015 | Wedderburn et al. | |
| 2015/0254589 A1 | 9/2015 | Saxena et al. | |
| 2015/0281356 A1 | 10/2015 | Maturana et al. | |
| 2015/0333899 A1 | 11/2015 | Noebauer et al. | |
| 2015/0341230 A1 * | 11/2015 | Dave | H04L 41/5051 |
| | | | 705/7.29 |
| 2016/0171540 A1 | 6/2016 | Mangipudi et al. | |
| 2016/0217381 A1 | 7/2016 | Bloomquist et al. | |
| 2016/0291876 A1 | 10/2016 | Alatorre et al. | |
| 2017/0041296 A1 | 2/2017 | Ford et al. | |
| 2017/0063724 A1 | 3/2017 | Cao et al. | |
| 2017/0083967 A1 | 3/2017 | Shiely et al. | |
| 2017/0124340 A1 | 5/2017 | Chiu et al. | |
| 2017/0140328 A1 | 5/2017 | Downs et al. | |
| 2017/0323250 A1 * | 11/2017 | Lindbo | G06Q 30/0621 |

OTHER PUBLICATIONS

Optimization of order fulfillment in distribution network problems. Journal of Intelligent Manufacturing 17.3: 307. Springer. (Jun. 2006).*

(56) References Cited

OTHER PUBLICATIONS

NIST, "NIST Cloud Computing Program", http://csrc.nist.gov/groups/SNS/cloud-computing/index.html, Created on Nov. 15, 2010, Last updated on Mar. 2, 2016, 2 pages.
Acimovic, J. A., "Lowering Outbound Shipping Costs in an Online Retail Environment by Making Better Fulfillment and Replenishment Decisions", Thesis, Massachusetts Institute of Technology, Sep. 2012, 198 pages.
Kewill Corporation, "Omni-channel Optimization for Retailers: Fulfillment best practice to deliver on customer promises and drive down returns", Jul. 2013, 12 pages.
Xu, P. J., "Order Fulfillment in Online Retailing: What Goes Where", Thesis, Massachusetts Institute of Technology, Sep. 2005, 146 pages.
Brolin, S., "Balancing the Costs for Finished Goods Inventory and Production Capacity in a Make-to-Order Company", Master Thesis, Lund University, Jun. 2015, 106 pages.
Office Action dated Apr. 21, 2020 received in U.S. Appl. No. 15/153,963 30 pages.
Mell, P. "The NIST Definition of Cloud Computing," NIST Special Publication 800-145, National Institute of Standards and Technology, U.S. Department of Commerce, Sep. 2011, pp. 1-7.

\* cited by examiner

US 10,839,338 B2

ORDER SOURCING WITH ASYNCHRONOUS COMMUNICATION AND USING OPTIMIZATION FOR LARGE SOURCING NETWORKS

CROSS REFERENCE TO RELATED PATENTS AND APPLICATIONS

This application claims priority from U.S. Provisional Application No. 62/279,738 filed on Jan. 16, 2016, which is incorporated by reference herein in its entirety.

FIELD

The present application relates generally to computers and computer applications, and more particularly to cloud infrastructure, big data analytics, and optimizing sourcing networks.

BACKGROUND

Entities such as retailers are looking to leverage their store network along with their warehouses, distribution centers (DCs) and e-fulfillment centers (EFCs) to fulfill omni-channel demands. Traditionally, order management system solutions addressed order fulfillment from a relatively small number, e.g., tens, of nodes based on inventory availability from a DC and/or data warehouse. Incorporating local stores into fulfillment networks requires reconfiguring of the fulfillment operations from the traditional setting of selecting from tens of nodes to much larger, for example, potentially thousands of nodes. It is not easy for an existing order fulfillment management system to handle the scale and complexity of the new requirements, scale and dynamic feature of the problem. Past solutions have been to largely simplify the problem.

BRIEF SUMMARY

A method and system of determining fulfillment source nodes using optimization performed in a computer environment comprising a shared pool of configurable computing resources, may be provided. The method, in one aspect, may include executing a predictive engine on the computer environment, to perform a predictive analysis on data pipelined into the computer environment, the data received from a plurality of sources and in a plurality of different formats, the predictive engine generating a network level cost information based on the predictive analysis on a dynamic and continuous basis. The method may also include receiving, by one or more processors, asynchronous communication from the predictive engine, the asynchronous communication comprising the network level cost information generated by the predictive engine. The method may also include generating, by one or more of the processors, a set of candidate nodes for order fulfillment based on the network level cost information and a defined distance between the set of candidate nodes and a target destination. The method may further include executing an optimization engine on the computer environment, the optimization engine filtering the set of candidate nodes further based on the network level cost information. The method may also include receiving, by one or more of the processors, a synchronous communication from the optimization engine, the synchronous communication comprising a set of fulfillment nodes filtered from the set of candidate nodes. The method may further include executing, by one or more of the processors, a solver to select a threshold number of fulfillment nodes from the set of fulfillment nodes that meet one or more constraints. The method may also include outputting the threshold number of fulfillment nodes.

A system of providing fulfillment source nodes using optimization performed in a computer environment comprising a shared pool of configurable computing resources, in one aspect, may include one or more hardware processors having a network interface device. One or more of the hardware processors may be operable to invoke a predictive engine to execute on the computer environment, the predictive engine performing a predictive analysis on data pipelined into the computer environment, the data received from a plurality of sources and in a plurality of different formats, the predictive engine generating a network level cost information based on the predictive analysis on a dynamic and continuous basis. One or more of the hardware processors may be further operable to receive asynchronous communication from the predictive engine via the network interface device, the asynchronous communication comprising the network level cost information generated by the predictive engine. One or more of the hardware processors may be further operable to generate a set of candidate nodes for order fulfillment based on the network level cost information and a defined distance between the set of candidate nodes and a target destination. One or more of the hardware processors may be further operable to invoke an optimization engine to execute on the computer environment, the optimization engine filtering the set of candidate nodes further based on the network level cost information. One or more of the hardware processors may be further operable to receive a synchronous communication from the optimization engine via the network interface device, the synchronous communication comprising a set of fulfillment nodes filtered from the set of candidate nodes. One or more of the hardware processors may be further operable to execute a solver to select a threshold number of fulfillment nodes from the set of fulfillment nodes that meet one or more constraints. One or more of the hardware processors may be further operable to output the threshold number of fulfillment nodes.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
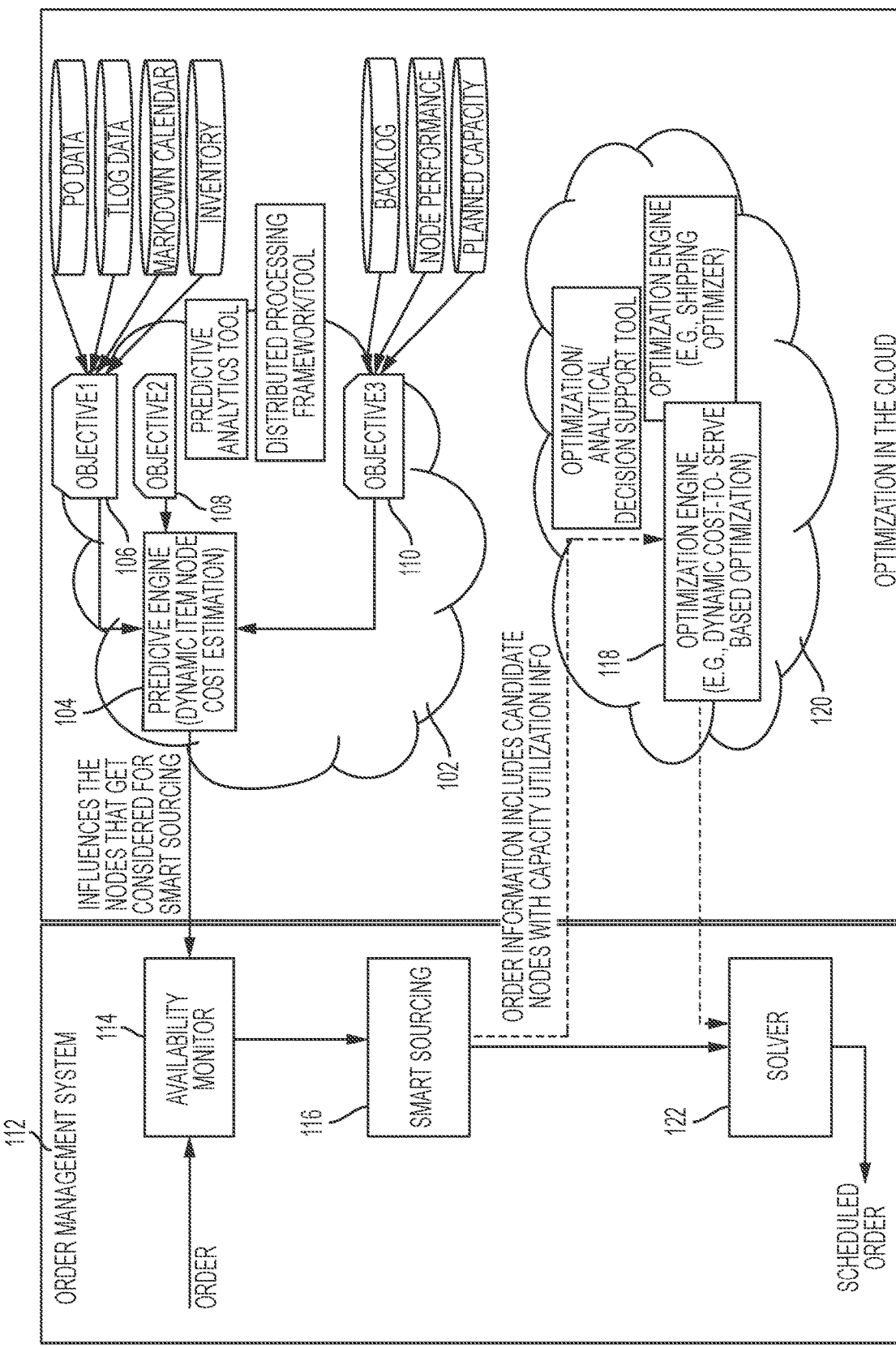
FIG. 1 is a diagram illustrating components of a system that provides fulfillment source nodes in one embodiment of the present disclosure.

A system, method, computer program product, and techniques in one embodiment of the present disclosure may provide a big data predictive engine that provides predictive costs for nodes and items at the current time, enabling, and the cost-based selection of an optimal set of candidate fulfillment nodes. The big data predictive engine, for example, is hosted and executed on a cloud computing environment with which a network of fulfillment systems may communicate. A fulfillment system or order management system may receive asynchronous communication from the big data predictive engine that provides dynamic information. An optimization engine may also be provided that can access and dynamically compute a cost considering multiple dimensions and make a recommendation of the optimal nodes. The fulfillment system or order management system, for example, may invoke the optimization engine, which may also be hosted and executed on the cloud computing environment. The system, method and techniques of the present disclosure in one embodiment, allow leveraging of cloud big data and optimization to perform order fulfillment and optimization, extending beyond the capabilities of existing order management systems. The system, method and techniques of the present disclosure in one embodiment allow big data flow from a variety data sources, updating the cost dynamically, for example, without impacting the on-premise order management system.

It is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

FIG. 1 is a diagram illustrating components of a system that provides fulfillment source nodes in one embodiment of the present disclosure. A node refers to any fulfillment channel in a fulfillment network, such as a store, a warehouse (distribution center), third party logistics, or any other entity that may include product for distribution or sale. In one embodiment, the fulfillment source nodes are determined based on big data analytics performed on a cloud, a computer environment 102 comprising a shared pool of configurable computing resources. External data is pipelined into the computer environment, for example, cloud computing environment. The computer environment in one embodiment supports big data infrastructure. For instance, external data such as inventory, order, point of sale (POS) in-store transaction log data are received and stored as shown at 106, 108 and 110. A big data predictive engine 104 in one embodiment performs predictive analysis based on the external data 106, 108, 110, and generates network level cost information, for example, dynamic item and node cost estimation. Network level cost information refers to an up-to-date estimate of the cost of assigning an item to a particular node for sourcing, for example, for each business objective cost being modeled. For instance, the network level cost information may be updated regularly as the state of the network changes. The state of the network changes may be determined by the input data feeds, as well as the system's own internal state as it keeps track of the sourcing decisions it has made. In one embodiment, this item and node cost is then used in selecting the candidate nodes to be passed to an optimizer (e.g., 118). In one embodiment, the methodology of the present disclosure may replace the existing smart-sourcing approaches (e.g., based on node distance to destination alone) with one that reflects the actual costs being optimized, with the same weightings the optimizer portion of the system will consider. In one embodiment, the methodology of the present disclosure derives costs that enable selecting nodes such that the set of selected node will most likely also contain the final solution of the optimizer, if it were allowed to consider all of the nodes. In one embodiment, these costs may represent the sourcing-time costs the optimizer will see when making the decision of which node to source parts of the order from. In one embodiment, the multiple business costs (e.g., 106, 108, 110) are weighted by importance factors (e.g., weights may be configurable, for example, by users such as the retailer business users)—and the optimizer (e.g., 118) may minimize the weighted sum of costs. The predictive costs in one aspect may reflect the sourcing-time costs, and the predictive cost assigned to each item and node may then represent a weighted sum of the predictive cost for each business objective cost, for instance, along with a factor added reflecting the destination for the current order, e.g., a factor related to distance. Then, in one embodiment, to select the candidate nodes, the top k nodes are selected with minimum total predicted cost (for example, rather than distance, although distance can be included)—where k is a tunable parameter. For instance, users such as retailers may be allowed to set the tunable parameter, for example, based on the load their systems are able to handle. For example, limitations on their inventory managements system may limit how many candidate nodes a retailer's system can retrieve live information for, such as inventory, in a timely manner, so k may be set to a small enough number not to overburden their on-premise systems.

Another aspect of a methodology of the present disclosure may include enabling this process to work with retailers' existing order management systems (OMSs) (for example, as shown in FIG. 1). A system and/or method in the present disclosure in one embodiment enables integrating this more accurate, large-scale order sourcing optimization, to existing order management systems (e.g., as implemented in retailer systems currently), via data feeds and/or dumps to the predictive cost cloud, a feed from the cost cloud to deposit the predictive total costs in the cost table used by the smart sourcing logic, and call outs from an existing order management system (OMS) to the optimization cloud with the order information and candidate nodes, from which is returned the optimizer's selected nodes. Thus, in one embodiment, the methodology of the present disclosure may enable integration with the existing systems allowing for easy adoption and without having to change the entire existing systems. In this way, the existing system may remain in place, with adoptable components that select the candidate nodes and optimize the order handled by the cloud-based engines of the system. For example, a retailer's on premise system will pass the order information to the optimizer, but already it would have restricted the set of candidate nodes it can choose from to those satisfying the rules configured by the retailers' in their system (for example, such that certain types of orders can only be sent to certain nodes). Furthermore, all the checks and verification performed on the sourcing result still occur after the sourcing result is returned from the cloud to the on-premise system, so users (e.g., retailers) do not have to change the many rules and conditions they carefully configured over time.

In one aspect, the system and/or method of the present disclosure may provide a way to add on massive increases and improvements in data processing, predictive modeling, and optimization capabilities, via the cloud-based systems and methods for interfacing with the on-premise systems, without heavily impacting or requiring changes to the existing on-premise systems, for example, which may have limited resource and capabilities. The following describes an overview of the processing performed for providing such capability in one embodiment of the present disclosure, and for example, shown in FIG. 1. Data feeds may be received on a regular basis or periodic basis, for example, from an on-premise system, and for example, as well as other internal business systems of a retailer. A predictive cost cloud (e.g., shown at 102) may continuously process these data feeds, and analyze the updated data, using big data technologies such as Hadoop and distributed computing, on a cluster of machines. Responsive to determining that its predicted costs have changed significantly (e.g., by a threshold amount), the predictive cost cloud may send updates to a cost table of the on-premise system. The on-premise system may hold or store the costs used in determining which candidate nodes to select (which, may be combined with node-distance during the candidate node selection process). When it is time to determine how an incoming order should be sourced, an OMS system as a separate process (e.g., 112) may use the predictive costs outputted in its cost table that are continuously being updated by the predictive cost clouds (e.g., 102) to influence which candidate nodes are selected.

Which candidate nodes to select may depend to an extent on the on-premise system and what it supports, and may be achieved in a number of ways. On-premise systems consider each line of an order, and choose a number of candidate nodes for that order based on expected inventory availability and distance. The final set of candidate nodes is the combined set of nodes per item. In the present disclosure, the system and/or method in one embodiment may also include the predicted costs. Since the predictive costs the system and/or method derives are specific to an item and node pair, the system and/or method of the present disclosure in one embodiment enables the selection of a set of nodes for each item of the order. In one embodiment, the predicted costs are at the item and node level, and are included to influence the selection. For instance, one way is to take the weighted total of each business objective cost for an item and node, and to choose the nodes with minimal sum of the weighted normalized total cost and weighted distance for each. For example, in this case, the total predicted cost for each node may be divided by the cost for the node with the highest predicted cost, so that each cost is determined to be between 0 and 1. Similarly, the distance for each node may be divided by the distance of the farthest node, so that each distance is determined between 0 and 1. Then weights specified by a user (for example, the retailer) indicating the importance of shipping cost vs. other objectives can be used to weight and sum the two values, arriving at a single value on which to base the selection. Another approach, for example, may include translating the distance along with other properties of the order to a cost value amount and directly summing all the costs.

Once the candidate nodes have been selected, the order continues to flow through the on-premise system. The on-premise system eventually creates a record describing the order, its characteristics, and the candidate nodes, and a user-exit mechanism of the on-premise system may be used to send this information to the cloud-based optimizer to perform large-scale, exact combinatorial optimization. The cloud based optimizer (e.g., 118) takes this information, and the item+node cost information from the predictive cost cloud component (e.g., 102), and optimizes the sourcing result to minimize the total cost—e.g., shipping cost along with all the other business objective costs—which are in part determined by the predictive cost cloud outputs. For example, for one business objective the predictive cost cloud may determine a cost of 0.3 dollars per item and node. The optimizer than determines the total cost of assigning n number of items from the order to that node as n*0.3, and uses this total cost, in comparison with such costs derived for all other nodes under consideration. This stage of the optimization is exhaustive and/or comprehensive—it directly optimizes the order sourcing assignment to minimize total costs, considering all combinations, e.g., as opposed to using a heuristic approach to mitigate the scale of the problem.

Additionally, in one embodiment, the optimizer finds a solution that is compatible with how the on-premise system will use that solution, which may, for example, entail incorporating additional constraints in the optimization problem being solved itself. For example, the on-premise system may only be able to use rankings returned from the optimizer, and may assign all items possible to the top ranked node, as opposed to splitting assignments as the optimizer might specify. In one embodiment, the optimizer of the present disclosure may take into account such scenario in the optimization itself, for example, so that the final assignment made by the on-premise system is not sub-optimal. Once the optimizer has found its solution and encoded it in the correct form as required by the particular on-premise system, it returns this result to the on-premise system via the return from the user-exit call-out. The on-premise system then proceeds to process the sourcing result (e.g., checking and validating it), and placing the sourcing assignment in the system, which involves releasing the order assignments to the nodes for picking, packing, and shipping the items of the order, as specified by the order sourcing assignment result.

Dynamic item and node cost estimation means that the costs associated with each item and node pair, which are the predicted or estimated costs for assigning a unit of that item to that node during sourcing for each particular business objective cost such as load balancing, are continuously being updated based on the current state of the network, such as the current number of units already assigned to a node, the current availability of workers at each node, the last known inventory level at each node, the predicted demand at each node, and/or other states. In one aspect, item and node cost estimation is dynamic because this network state data and information is continuously getting updated to reflect the current real-time state of the network, through the regular and asynchronous data feeds, and also through the system's own internal representation of the network state it maintains, for example, in part based on the sourcing decisions it has made so far.

Performing the item and node level (per item and node) cost prediction, including the inputs and steps necessary, depends on the particular business cost being modeled, and this system and method is meant to be applicable across any possible business objective costs considered as well as different data sources. In one embodiment, the final predictive cost for a given business objective is a single value for an item and node—for example, representing the per-unit dollar cost of assigning a unit quantity of the particular item to that particular node during sourcing, for that particular business objective cost. However, the methodology of the present disclosure is not limited to dollar cost, and the final cost can be any sort of cost representation, such as relative or scaled cost that does not have any connection to monetary value, as long as the costs can be compared or combined between different business objectives. The particular details of how the cost is computed, and what data it uses, depends on the particular business objective cost being modeled and what data is available for modeling it, and even for the same business cost can be modeled in any number of ways—this invention is not meant to be restrictive to any one particular method. The system and/or method of the present disclosure works and can incorporate any particular cost modeling approach. To illustrate an example, however, the following describes a possible cost modeling approach. For this example, one cost may be modeling the cost around the business objective of balancing load across the network, with the goal of avoiding over-stressing a particular node in the network by going past the capacity (number of units the node can process in one day based on the workers assigned to work at that task at that node), and also avoid under-utilizing the processing capacity of the nodes. In this case, the predictive cost may be the expected future cost of assigning a single unit of an item to a node—which may be based on the probability that the item will end up getting backlogged (processed—picked, packed and shipped—on a later date than the one it is released to the node) and requiring upgraded shipping, due to the node not being able to process it in time so there are fewer days to deliver the order. In this example case, the predictive cost is the expected future cost and is based on the current capacity utilization of the node (e.g., the number of units already assigned to the node so far that day, relative to the capacity of the node for that day), and, for example, potentially other factors like the hours left in the day. These input factors may be received from system feed updates, and/or the system's own internal representation—e.g., the system may keep track of how many items it has assigned to each node so far to know the current real-time utilization of any node in the network and base the cost on such current real-time utilization. In this example case, one of the feeds may be a weekly feed providing the capacity of each node for the next several weeks—based on the worker assigned to each node for picking and packing orders. Additionally, historical data fed into the system may be used to determine the models for probability of backlog which are used in determining the dynamic predictive costs. The final cost may be then determined as an expected dollar cost (or another cost), the sum of the dollar costs (or another cost) that may arise under different scenarios, such as if the item of the order became backlogged for 3 days, multiplied by the probability of the scenario. Different cost modeling approaches are described in further detail in co-pending U.S. patent application Ser. No. 15/087,569, entitled "A System and Method to Incorporate Node Fulfillment Capacity and Capacity Utilization in Balancing Fulfillment Load Across Retail Supply Networks", filed on Mar. 31, 2016, which application is incorporated herein by reference in its entirety; U.S. patent application Ser. No. 15/088,686, entitled "A System and Method to Incorporate Node Fulfillment Capacity and Network Average Capacity Utilization in Balancing Fulfillment Load across Retail Supply Networks", filed on Apr. 1, 2016, which application is incorporated herein by reference in its entirety; U.S. patent application Ser. No. 15/154,119, entitled "A System and Method to Incorporate Customized Capacity Utilization Cost in Balancing Fulfillment Load across Retail Supply Networks", filed on May 13, 2016, which application is incorporated herein by reference in its entirety; U.S. patent application Ser. No. 15/153,921, entitled "A System and Method to Incorporate Node Fulfillment Capacity and Network Average Capacity Utilization in Balancing Fulfillment Load Across Retail Supply Networks", filed on May 13, 2016, which application is incorporated herein by reference in its entirety.

In one embodiment, the predictive engine 104 transmits the network level cost information, for example, the dynamic item and node cost estimation to an order management system (OMS), for instance, to an OMS availability monitor of an OMS. An order management system 112 in one embodiment includes one or more computer or hardware processors that run functionalities of order management. For example, the order management system 112 may include an availability monitor 114, a smarting sourcing function or module 116 and a solver function or module 122. The order management system 112 may maintain inventory and availability-related configuration and information (e.g., information stored in a storage device or database repository associated with the order management system's computer system) for all participating nodes.

The order management system may receive an order to fulfill. In one embodiment, the availability monitor 114 receives the network level cost information, for example, the dynamic item and node cost estimation from the big data predictive engine 104. This network level cost information influences the nodes that get considered for smart sourcing. The availability monitor 114 may also check for inventory availability from various source nodes.

The smart sourcing module 116 determines or selects a set of optimal candidate nodes from a pool of source nodes, based on the network level cost information received in the availability monitor 114 generated by the big data predictive engine 104, and based on the geographical distances between the source nodes and a target destination where the order is to be delivered. In determining how an incoming order should be sourced, for example, responsive to receiving a request for one or more order fulfillments, the OMS system in one embodiment uses the predictive costs outputted in its cost table that are continuously being updated by the predictive cost clouds (e.g., 102) to influence which candidate nodes are selected. This may depend both to an extent on the particular approach to predictive cost modeling, and the on-premise system and what it supports, and may be achieved in any number of ways. The system and/or method of the present disclosure are not meant to be restrictive to any particular approach for how to use the predictive costs to change the candidate selection. An embodiment of the system and/or method of the present disclosure may include obtaining, possibly combining, and storing the predictive costs for multiple business objectives, and given the final cost determination, selecting the top nodes. For example, for obtaining the final inputs to smart sourcing, the predictive cost per item and node is used. The system and/or method of the present disclosure may replace the existing smart-sourcing approaches (e.g., based on node distance to destination alone) with one that reflects the actual costs the system is trying to optimize, with the same weightings the optimizer portion of the system would consider. The system and/or method in one embodiment derive costs that enable selecting nodes such that the set of selected node will most likely also contain the final solution of the optimizer, if it were allowed to consider all of the nodes. These costs are generally meant to as accurately as possible represent the sourcing-time costs the optimizer will see when making the decision of which node to source parts of the order to. In one embodiment, the multiple business costs are weighted by importance factors (e.g., users such as the retailer users may be allowed to configure or set such weights via a user interface or another mechanism)—and the weighted sum of costs is what the optimizer minimizes—therefore in this case the predictive costs may reflect the sourcing-time costs, and the predictive cost assigned to each item and node is then a weighted sum of the predictive cost for each business objective cost—for example, along with a factor added reflecting the destination for the current order, e.g., a factor related to distance. In one embodiment, these predictive costs per item and node per business objective (or else weighted total incorporating the costs for all business objectives) is transferred and stored in a costs table on the on-premise system used for selecting the candidate nodes, or queried from the cost cloud in real-time, for example, based on the system capabilities.

Given the cost determination, an optimizer in one embodiment determines or selects top nodes. On-premise systems consider each line of an order, and choose a number of candidate nodes for that order based on expected inventory availability and distance. The final set of candidate nodes is the combined set of nodes per item. The system and/or method of the present disclosure in one embodiment also include the predictive costs. Since the predictive costs the system and/or method derive in one embodiment are specific to an item and node pair, the system and/or method enable the selection of a set of nodes for each item of the order. For example, the predicted costs are at the item+node level (item and node level), and are included to influence the selection. Determination of the predicted costs and item and node level may be performed in a number of ways and the present disclosure does not restrict the method to any particular way. For instance, one embodiment may take the weighted total of each business objective cost for an item and node, and choose the nodes with minimal sum of the weighted normalized total cost and weighted distance for each. For example, in this case, the total predicted cost for each node may be divided by the cost for the node with the highest predicted cost so that each result is between 0 and 1. Similarly, the distance for each node may be divided by the distance of the farthest node, so that each distance value is between 0 and 1. Then weights specified by the user, e.g., retailer, indicating the importance of shipping cost compared to other objectives may be used to weight and sum the values, arriving at a single value on which to base the selection.

Then, in one embodiment, the top k nodes with minimum total cost value are selected as the candidates. Other approaches are also possible. For example, another approach may include translating the distance along with other properties of the order to a cost value amount and directly summing all the costs. In another embodiment, top nodes may be selected based on total cost within a defined geographic distance (e.g., based on shipment zones) from the destination of the order. In this embodiment, a starting radius is chosen, and the top k nodes with minimum total predictive cost are taken from all nodes within that radius. The radius may be increased, if there are not enough nodes in the starting radius. For example, the system and/or method of the present disclosure may start with a starting radius of one shipment zone, in which there may be only 5 candidate nodes in that radius, and therefore all 5 nodes are selected as candidates. The system and/or method may then next expand the radius to 2 shipment zones—for which there may be 50 candidates. If top candidates, k, are set to 20, then the system and/or method of the present disclosure may only select 15 nodes from this set of 50 as final candidates. To do so, the system and/or method of the present disclosure may select the nodes with the lowest total predictive cost. In one embodiment, to select the candidate nodes, the top k nodes are selected with minimum total predicted cost (for example, rather than only considering distance, although distance may be incorporated in the single cost value). In one embodiment, k may be a tunable or configurable parameter a user (e.g., a retailer) may be allowed to set, e.g., based on the load the user's systems are able to handle. For example, limitations on the user's inventory management system may limit how many candidate nodes the user's system can retrieve live information, such as inventory, in a timely manner. For example, k may be set to a small enough number not to overburden the user's on-premise systems. In another embodiment, the system and method of the present disclosure may enable or cause automatic setting of the k value based on automatically discovering the on-premise system's current capability.

The OMS 112 may punch out (e.g., make a service call and receive the returned values from that call) to an optimization engine 118, also referred to herein as a dynamic cost-to-serve optimization module, with order information that includes candidate nodes with capacity unitization information. The order information also includes order detail information, such as order number, item, quantity, zip code, service level agreement (SLA). For example, in one embodiment, the OMS 112 may make a service call via the interface to the cloud (e.g., 120), and waits for a return from that call. An optimization engine (e.g., 118) invokes the optimization process in the cloud (e.g., 120), finds the solution, and returns the solution to OMS 112 (e.g., as the sourcing result from that "punch out" also known as "user-exit" call). Responsive to an occurrence of an error (e.g., the optimizer cannot get a solution in time or process that particular order, or another error), the engine (118) may throw an exception. Responsive to receiving such an exception, OMS 112 may determine the sourcing itself via its usual process.

The optimization engine 118, for example, runs on a cloud computing environment 120, and performs a multi-dimension optimization and recommends one or more optimal nodes from the set of candidate nodes. The computing environment 120 in one aspect may be the same computing environment shown at 102. In another aspect, the computing environment 120 may be a different environment from the one shown at 102. The optimization engine 118 transmits the one or more recommended optimal nodes to the OMS 112. Any optimizer may be used to find the order sourcing assignments to the nodes with the minimum total cost across the various business objective costs, and the system and/or method of the present disclosure in one embodiment is not restricted to one particular optimizer or solver. Rather, for example, because of the predictive cost modeling being used to incorporate the actual modeled costs for the different business objectives, the candidate nodes will more likely contain the minimum total cost nodes. Additionally, because there is a smaller set of candidate nodes, an exhaustive optimization can be performed. In particular, in one embodiment a combinatorial optimizer, may used to search through all possible assignments (in an efficient way) and choose the assignments for the order resulting in the lowest total cost.

The solver module 122 receives the one or more recommended optimal nodes and further selects one or more fulfillment nodes based on one or more constraints and rules preconfigured in the OMS 112. For example, the recommended one or more optimal nodes that meet the constraints and/or preconfigured rules are selected as a fulfillment node. In one embodiment rules and/or constraints may be set in the OMS 112, for example, customized for a user system. For example, there may be rules for items of particular categories. One example of a rule is for items falling in the hazardous material category—there may be requirements that they can only ship from certain nodes, or that they must ship alone, or that they must ship via only a predefined shipment method that may not be available everywhere. Another example of a rule may apply to web-exclusive orders—the retailer may wish to require that such orders are sourced in a particular way, different then what the optimizer does, such as selecting from a defined set of nodes first, if they are available there, before selecting other nodes, e.g., from stores where the items were returned to but cannot be purchased by in-store customers due to the item being web-exclusive. The solver module 116 outputs the selected one or more fulfillment nodes. The OMS 112 then may schedule the order and direct the selected fulfillment nodes to fulfill the order.

In one embodiment, a time out mechanism may be employed to make this approach failsafe. For instance, the smart sourcing module 116 by operating with the components 104, 118, e.g., on the cloud, increases margin on the order. The time out mechanism may default to smart sourcing, for example, offline, in which an order management system 112 responsive to receiving an order checks for inventory availability. The smart sourcing module 116 may select a set of candidate nodes based on distance, and the solver 122 may further select fulfillment nodes based on constraints and rules that are pre-configured in the order management system. The system and/or method of the present disclosure in one embodiment enables or allows entities such as retailers to perform large scale order fulfillment optimization dynamically taking business values and/or cost into consideration.

Figure 2:
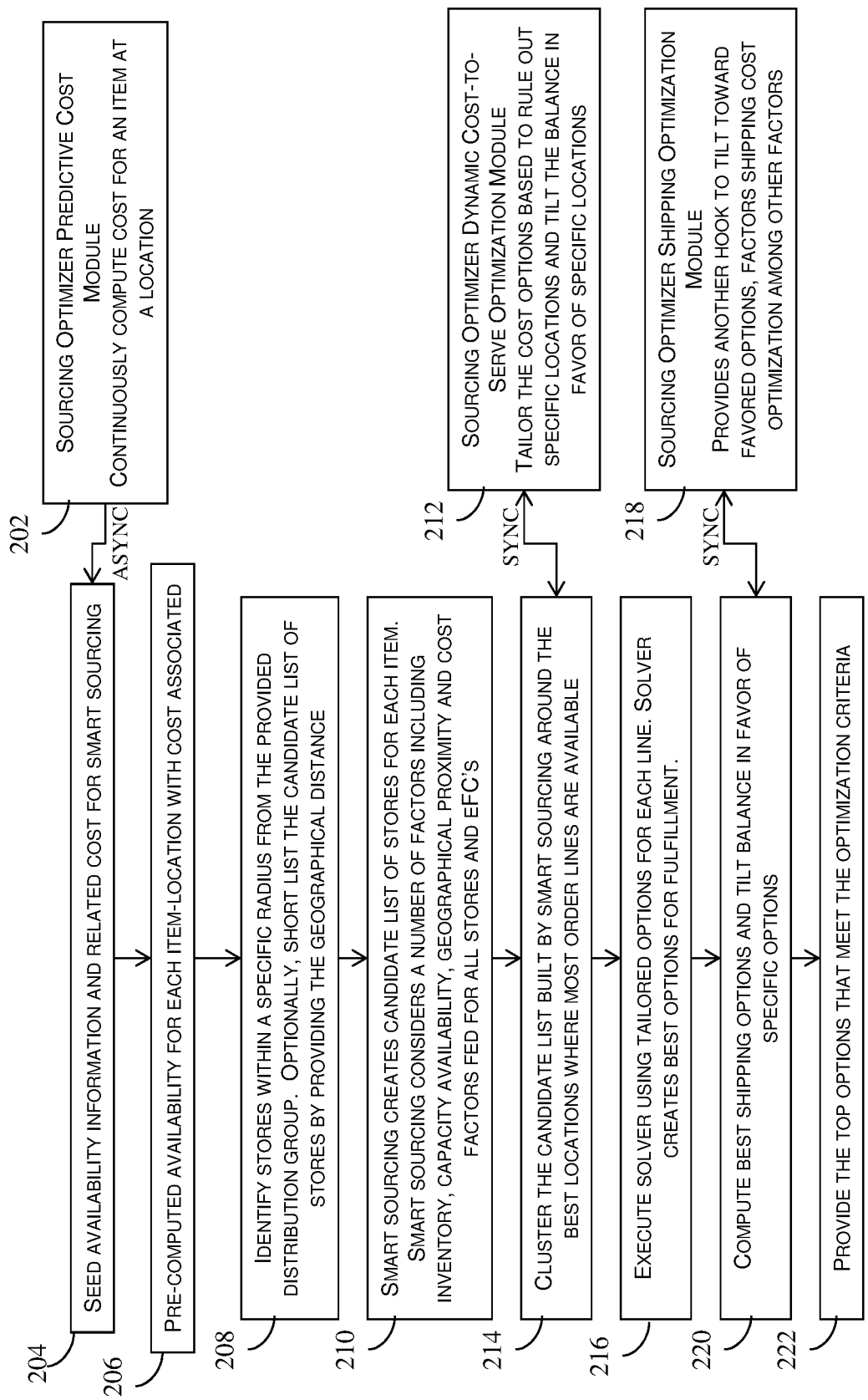
FIG. 2 is a flow diagram illustrating smart sourcing method that generates a set of recommended nodes considered to be optimal in one embodiment of the present disclosure.

FIG. 2 is a flow diagram illustrating smart sourcing method that generates a set of recommended nodes considered to be optimal in one embodiment of the present disclosure. The method is performed or executed on one or more hardware processors, for example, by a smart sourcing module of an order management system shown in FIG. 1. The smart sourcing methodology of the present disclosure in one embodiment filters nodes based on item and/or node cost information and distance (e.g., radius) between a candidate source node and a destination to which the order is fulfilled (referred to also as a target destination). For example, the smart sourcing methodology selects nodes that are geographically located within a defined radius from the target destination, and selects target or assignment nodes based on item and/or node cost.

In one embodiment, the processing at 202, 212 and 218 may be performed by one or more optimization modules executing on a cloud computing environment. In one embodiment, the processing at 204, 206, 208, 210, 214, 216, 220 and 222 may be performed by an order management system, for example, by invoking an application programming interfaces provided in the order management system. The processing at 204 may be precomputed, for example, prior to receiving an order to produce output shown at 206. The processing at 208, 210, 214, 216, 220 and 222 perform order management system functions such as inventory inquiry, schedule and release.

At 202, a predictive engine executing on one or more hardware processors, e.g., part of a cloud computing environment, e.g., shown in FIG. 1 at 104, continuously computes cost for an item at a location based on a plurality of data received from a variety of data sources. The predictive engine may consider multiple factors, for example, including markdowns that may occur dynamically. As the predictive engine continuously computes the cost information, the predictive engine asynchronously transmits the cost information to an order management system. At 204, an order management system, for example, executing on one or more hardware processors, seeds availability information and related cost information received from the predictive engine, for smart sourcing. For example, the order management system may process the information for ready to use, for example, by loading the values into one or more tables and/or in-memory data structures and caches to enable quick lookup, querying, and sorting, for use for determining candidate nodes. The order management system at 204 may continuously load information using an application programming interface (API). For instance, the order management system may continuously obtain the predictive costs for an item and node via an API to the predictive engine. In another aspect, the order management system may continuously receive and load cost updates into its own tables and/or memory stores and caches. An example API is 'LoadInventorryPerformanceSkuNodeCoset' API, which performs the loading of the current predictive cost around the inventory performance business objective cost for a particular node. The predictive cost cloud, using its cost modeling, data feeds, and known current state of the network continuously computes and updates the estimate of the inventory performance cost (based around nodes having too much or too little inventory for a particular item). This API may update the computed cost in the order management system, for example, receiving the update cost from the cost cloud, and loading that cost into the appropriate entry in its internal data stores, e.g., as a particular record in a table of cost values for each node and item pair, corresponding to the particular node and item that cost was for, and/or into its in-memory data structures, such as in-memory cache for faster retrieval, for example, if it is a commonly ordered item and commonly used node. The output of this processing at 204 includes in one embodiment pre-computed availability for each item at a location with associated cost shown at 206. In one embodiment, these costs are used to select the candidate node, and may reflect the actual costs the optimizer is taking into consideration for finding the lowest total cost nodes to assign the items of the order to. For example, they may correspond to actual estimated dollar costs related to each particular business objective—that is the dollar cost expected to be incurred if a unit of that item were sourced to that node.

At 208, the order management system, e.g., the smart sourcing module of the order management system, identifies nodes or stores from a provided distribution group, that are within a specific radius of the destination for the order. In another embodiment, optionally, a short list of candidate nodes or stores may be provided by the geographical distance. For instance, an order management system API such as 'getDistanceForNodeListUE' may be invoked to generate the short list. For instance, this API may take a list of nodes and a destination zip code and return for each node, the number of shipment zones between the node and the destination zip code (e.g., where shipment zones may be defined by a standard across different carriers). Another API may provide all nodes within a zone distance, which can be accomplished using any number of algorithms and efficient data structures for the purposes, such as k-dimensional tree (KD-tree) indexing. Yet in another embodiment, the order management system may support weightage to factor distance and cost. For example, in one embodiment, the predicted costs are at the item+node level, and are included to influence the selection. As described above, the method of the present disclosure is not restricted to a particular methodology for performing this selection. The following example approaches are described for illustrative purposes. For instance, one method to select nodes may include taking the weighted total of each business objective cost for an item and node, and choosing the nodes with minimal sum of the weighted normalized total cost and weighted distance for each as described above. The weights specified by the retailer indicating the importance of shipping cost compared to other objectives may be used to weight and sum the values, arriving at a single value to base the selection on. Then, in one embodiment, the top k nodes with minimum total cost value may be selected as the candidates. Other approaches are also possible, for example, translating the distance along with other properties of the order to a cost value amount and directly summing all the costs. In another embodiment, top nodes may be selected based on total cost within a certain geographic distance (e.g., based on shipment zones) from the destination of the order. In this embodiment, a starting radius is chosen, and the top k nodes with minimum total predictive cost may be taken from all nodes within that radius. The radius may then be increased, for example, if there are not enough nodes in the starting radius, for example, as described above, and the candidate nodes may be selected, for example, as similarly described above.

At 210, the order management system, e.g., the smart sourcing module of the order management system, creates a candidate list of nodes or stores for each item. The candidate list may contain a threshold number of nodes or stores, e.g., 25. In one embodiment, in creating the candidate list, the smart sourcing module may consider a number of factors including inventory, capacity availability, geographical proximity and cost factors fed for all stores and EFCs.

At 214, the candidate list built by the order management system, e.g., the smart sourcing module of the order management system, tries to cluster around the best locations where most order lines are available, for example, by invoking the dynamic cost-to-serve optimization module shown at 212. For instance, invoking 'OMPGetExternalCostforOptionsUE' API may execute the dynamic cost-to-serve optimization module at 212. At 212, dynamic cost-to-serve optimization module running on one or more hardware processors, e.g., on a cloud computing environment, tailors the cost options based to rule out specific locations and tilt the balance in favor of specific locations. The communication to the dynamic cost-to-serve optimization module is synchronous, e.g., in that the smart sourcing module calls the dynamic cost-to-serve module and receives the output of recommended nodes from the dynamic cost-to-serve module. This component may be provided, for example, in cases where the smart sourcing in the on-premise system is limited in its capabilities or cannot be easily modified to completely support the desired approach. The on-premise system may only be able to select a set of candidate nodes based on distance, a single cost number, or distance and a single cost number. The dynamic cost-to-serve optimization module in one embodiment allows for incorporating more complex logic (such as that described above of incorporating the predictive costs, of normalized weighting, of incremental inclusion in the set of candidate nodes based on shipping zones, or solving an optimization problem given the available information of all the items in the order and potential candidate nodes, or combinations thereof) to be used to select the final candidates. For example, in one embodiment, the on-premise system may be configured to send a larger set of starting candidates per item which are then further narrowed down by the optimization model that has access to more complete information about the network state and the different costs. Additionally, the dynamic cost-to-serve optimization component may solve a modified optimization problem. For instance, although the optimizer may not yet have the full order details, simply given which items are in the order and the candidate nodes for each, it may solve an approximation to the full optimization problem, e.g., assuming there is a single unit of each item and no restrictions on days to deliver, it may find the optimal set of candidate nodes directly.

At 216, a solver is executed with the recommended nodes as input. The solver further generates a set of fulfillment nodes from the recommended nodes based on constraints and/or preconfigured rules, and may output a threshold number of node options, e.g., top 5 nodes that meet the criteria specified by the constraints and/or preconfigured rules.

At 220, a shipping optimization module shown at 218 may be invoked to compute the best shipping options and select fulfillment nodes determined to have the best shipping options. For example, invoking 'OMPProcessRoutingExternallyUE' API provided in the order management system may execute the shipping optimization module at 218. This API ("user exit" UE) may pass the complete set of order details, for example, including the items and quantities in the order, the list of candidate nodes for each item in the order along with the available inventory for that item (e.g., in the form of how much of the quantity specified for that item it can fulfill), the destination for the order, the service level for the order (e.g., 1 day, standard, or other), and/or others. It passes this information as a call out to the optimization cloud, and waits for a return from it. The optimization cloud may return its proposed solution in a form (e.g., a ranking of the nodes), or it may return an exception. If it returns a solution, this solution may be returned via the API, otherwise the API may flag that the solution is not found and, for example, may provide a reason. If a solution is not returned, the order management system may proceed to determine the solution itself. At 218, shipping cost is factored in for determining the fulfillment nodes. In one aspect, the communication to the shipping optimization module is synchronous, e.g., in that the order management system may call the shipping optimization module and receives the output from the shipping optimization module. In one embodiment, this optimization module may be a module that perform the full total cost optimization, for example, exhaustively considering all possible order assignment combinations to find the one with the lowest total cost (across all business objective costs). In this case, costs can be more completely and accurately accounted for as all of the order details and information is available. For example, shipping cost can be directly and more accurately estimated, by taking into account all factors such as package weight for each possible assignment combination, carrier rate cards and transit days for each node and package weight, and/or others.

At 222, a threshold number of top options (fulfillment nodes determined to be optimal considering cost and distance, and optionally shipping cost) are output. For example, the list of preferred assignments is reduced to those that meet the pre-specified rules and constraints, configured by the retailers, in case there are any assignments at that point that do not meet the constraints or the state of the network has changed. This may act as a final safety check. Additionally, the optimizer component processing (e.g., at 212 and/or 218) may return a ranking of all the candidate nodes, and the processing at 222 may reduce the number to a pre-determined subset of options, such as 3, to be used in the final release process. Such subset of options may be predetermined based on the particular on-premise system, its functionality and capabilities.

Figure 3:
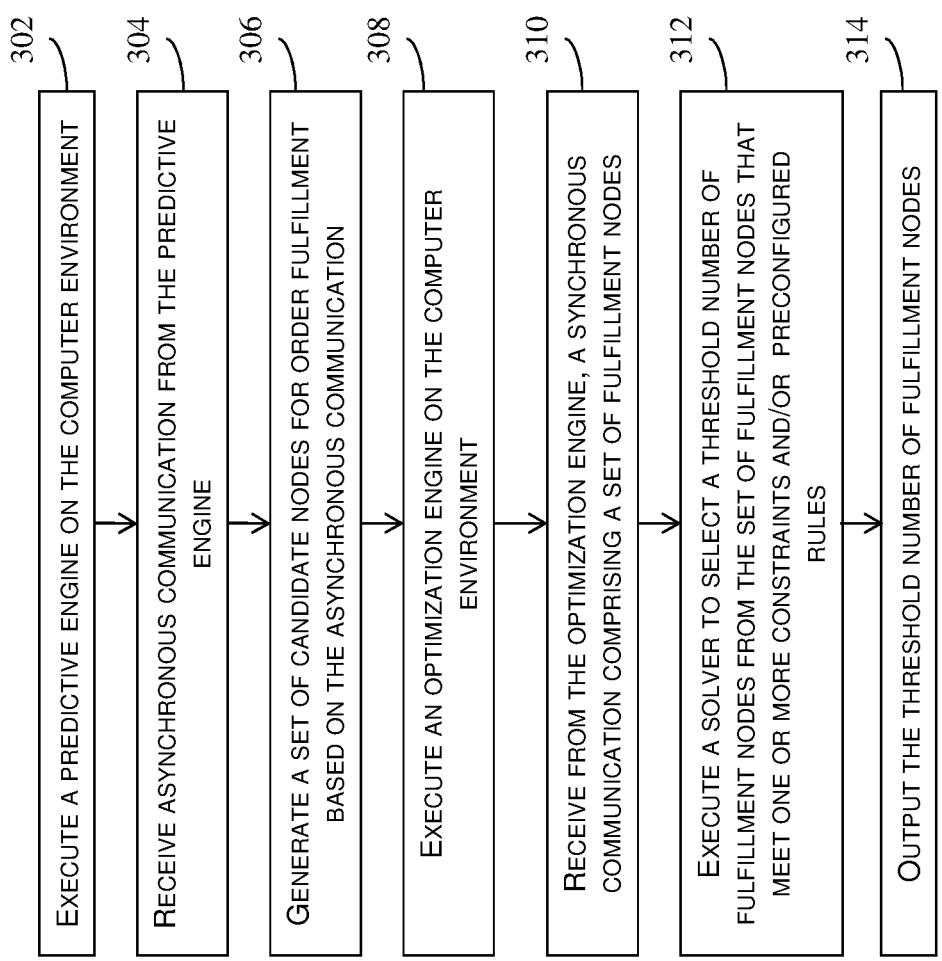
FIG. 3 is a flow diagram illustrating a method in one embodiment of the present disclosure that determines one or more fulfillment source nodes using optimization performed in a computer environment providing a shared pool of configurable computing resources.

FIG. 3 is a flow diagram illustrating a method in one embodiment of the present disclosure that determines one or more fulfillment source nodes using optimization performed in a computer environment providing a shared pool of configurable computing resources. At 302, a predictive engine is executed on the computer environment, to perform a predictive analysis on data pipelined into the computer environment. As shown in FIG. 1 at 106, 108 and 110, for example, the data is received from a plurality of sources and in a plurality of different formats. The predictive engine generates network level cost information based on the predictive analysis on a dynamic and continuous basis. The network level cost information includes a cost of an item at a node, for all nodes considered, for example, a pool of distribution nodes.

At 304, one or more processors, for example, executing an order management system receives from the predictive engine an asynchronous communication comprising the network level cost information generated by the predictive engine. The order management system may receive a series of such asynchronous communications, for example, as the predictive engine determines the network level cost information on a continuous basis, based on dynamically received data. The predictive cost engine in one embodiment continuously receives data feeds and takes into account order sourcing decisions, so that its knowledge of the current network state is continuously updated, along with its predictive costs. Responsive to determining that predictive costs, e.g., for one or more item, node, and business objective cost, have changed by a threshold degree or amount, the predictive cost engine sends the update to an on-premise order management system, in one embodiment. Data feeds are sent on a regular cadence from the on-premise system, as well as other internal business systems of the user, e.g., a retailer. The predictive cost cloud, for example, on which the predictive cost engine is executed continuously processes these data feeds, and analyzes the updated data, using big data technologies like Hadoop and distributed computing, on a cluster of machines. Responsive to determining that its predicted costs have changed, for example, by a threshold degree or amount, the predictive cost cloud may send updates, for example, to the cost table of the on-premise system, which holds the costs used in determining which candidate nodes to select, for example, which may be used in combination with node-distance during the candidate node selection process.

At 306, one or more of the processors, for example, executing the order management system generates a set of candidate nodes for order fulfillment based on the network level cost information and a defined distance between the set of candidate nodes and a target destination for a received order.

At 308, an optimization engine is executed on the computer environment, the optimization engine filtering the set of candidate nodes further based on the network level cost information. This optimization engine or module may in one embodiment, perform the full total cost optimization, exhaustively considering all possible order assignment combinations to find the one or more nodes with the lowest total cost (e.g., across all business objective costs). In this case, costs can be more completely and accurately accounted for as all of the order details and information is available. For example, shipping cost may be directly and more accurately estimated, by taking into account all factors such as package weight for each possible assignment combination, carrier rate cards and transit days for each node and package weight, and/or others. In one embodiment, a cloud based optimizer takes the order and candidate node information, as well as the item+node (item and node) cost information from the predictive cost cloud component, and optimizes the sourcing result to minimize the total cost, e.g., shipping cost along with all the other business objective costs, which may be in part determined by the predictive cost cloud outputs. For example, for one business objective the predictive cost cloud may determine a cost of 0.3 dollars per item and node. The optimizer then may determine the total cost of assigning n number of items from the order to that node as n*0.3, and use this total cost, in comparison with such costs derived for all other nodes under consideration. This stage of the optimization in one embodiment is exhaustive or comprehensive in that it directly optimizes the order sourcing assignment to minimize total costs, considering all combinations, for example, rather than using a heuristic approach that circumvents the scale of the problem. Additionally, the optimizer may find a solution that is compatible with how the on-premise system will use that solution, which may, for example, entail incorporating additional constraints in the optimization problem being solved itself. For example, the on-premise system may only be able to use rankings returned from the optimizer, and may assign all items possible to the top ranked node, rather than splitting assignments as the optimizer might specify. In this case, the optimizer may take such constraints of the on-premise system into account in the optimization itself, for example, so that the final assignment made by the on-premise system is not sub-optimal. One or more of the processors, for example, executing the order management system, may invoke the optimization engine to execute.

At 310, one or more of the processors, for example, executing the order management system, receives a synchronous communication from the optimization engine, the synchronous communication comprising a set of fulfillment nodes filtered from the set of candidate nodes by the optimization engine.

At 312, one or more of the processors, for example, executes a solver to select a threshold number of fulfillment nodes from the set of fulfillment nodes that meet one or more constraints and/or preconfigured rules. At 314, the threshold number of fulfillment nodes is output.

Optionally, a shipping optimization may be executed on the computer environment. The shipping optimization may further select one or more fulfillment nodes from the set of fulfillment nodes that incur least shipping cost. For instance, one or more of the processors, for example, executing the order management system, may invoke the shipping optimization, and receive a synchronous communication from the shipping optimization, the synchronous communication comprising the one or more fulfillment nodes selected from the set of fulfillment nodes by the shipping optimization. If this optional shipping optimization is performed, the threshold number of fulfillment nodes output at 314 may be selected from those nodes in the synchronous communication returned by the shipping optimization.

The processing shown in FIG. 3 may be performed responsive to an order management system running on one or more of the processors receiving an order for an item or product for fulfillment at a target location or node. In one embodiment, the threshold number of fulfillment nodes may be automatically directed to deliver the order to the target destination for order fulfillment. For example, automatic communication or message may be transmitted to the output fulfillment nodes to initiate shipping. Order sourcing in one embodiment may include electronic-commerce order sourcing, for example, for entities or retailer in electronic commerce.

A methodology of the present disclosure in one embodiment incorporates a big-data cloud computing for predictive analytics, feeding in historical and real time data, to derive cost estimates along multiple business objectives, handling a large scale fulfillment task. A cost-based filter is provided in one embodiment to select a promising, multi-business-objective-cost optimal set of candidate nodes. This candidate set selection cost modeling is different from direct objective modeling, as it selects a viable set of candidate nodes that is likely to contain the optimal sourcing solution. The methodology in one embodiment of the present disclosure is autonomic and dynamic in nature. For example, data feeding in continuously updates the costs in an automated way, and dynamic preferences of business users change how costs are compared, the candidate nodes and final sourcing decisions arrived at.

The methodology in one embodiment may include dynamically modeling costs in a comparable way so they are all considered at once. For example, the model enables trade-off between costs. Entity's changing needs and objectives feed into predictive cost and candidate node filtering. The methodology in one embodiment may also support dynamic adjustment by a user, e.g., to weigh different objectives higher, e.g., during different seasons or time periods. The trade-offs between costs may change over time and the constantly changing data and state can be fed back to provide dynamic, real-time predictions, costs, and candidate node selection. An optimization component may directly optimize total cost to serve (e.g., including all expected and/or business objective costs) in real-time for an order, factoring in the candidates nodes determined based on the predictive analytics' predictive cost modeling, and directly factoring in the predictive costs in the optimization problem. The methodology of the present disclosure may be integrated with an existing order management system and/or existing retailer's system. For example, the methodology of the present disclosure in one embodiment is designed to integrate with existing order management system or the like, and provides a way to achieve scalable network optimization within the confines of existing retailer's systems.

Figure 4:
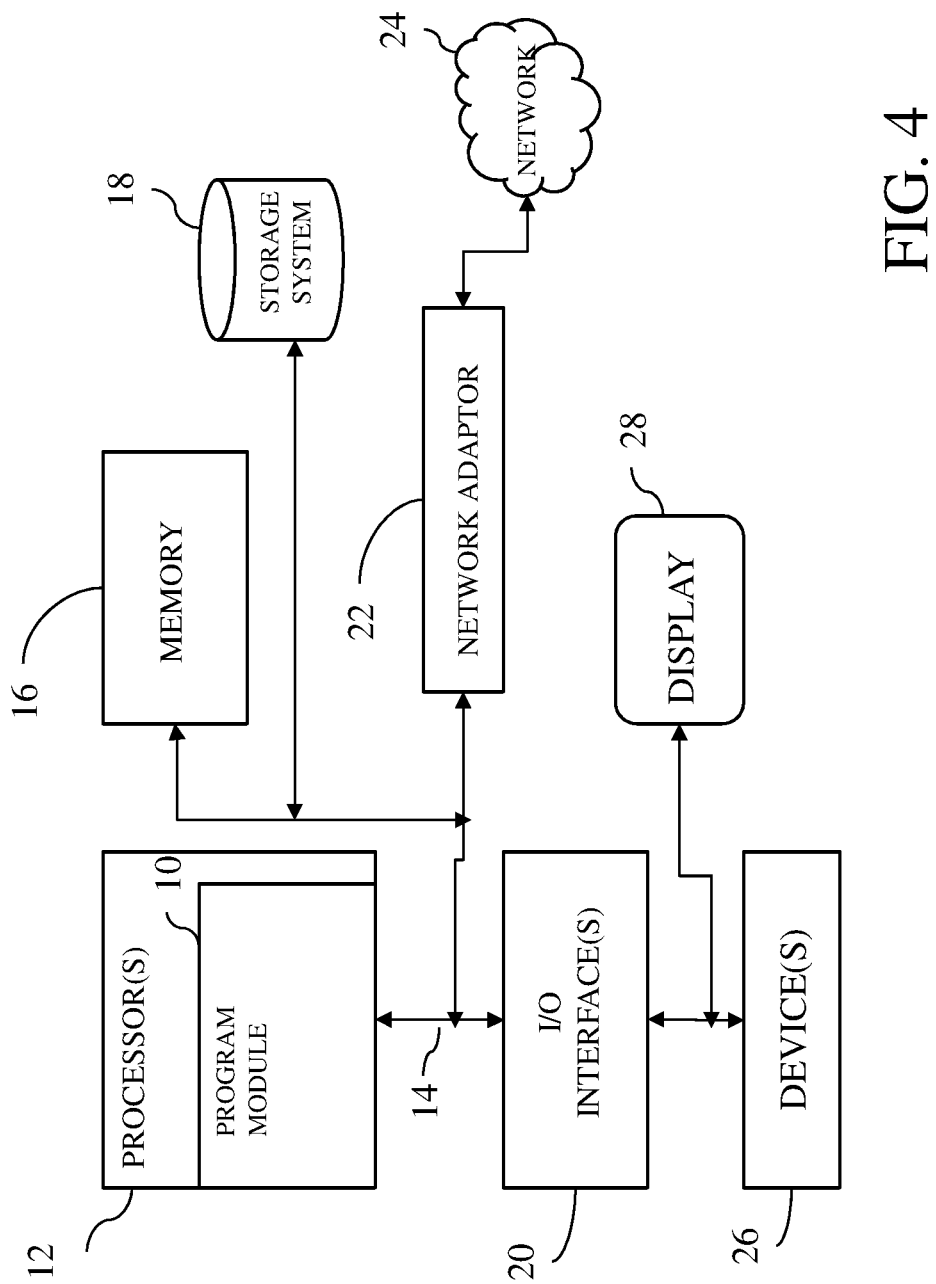
FIG. 4 illustrates a schematic of an example computer or processing system that may implement an order manage-

The methodology of the present disclosure in one embodiment may estimate multiple fulfillment business objective costs across a large store network, and make optimization of the fulfillment or sourcing decision feasible across such large network. The methodology in one embodiment considers costs that can be related to an entire order, both for selecting candidate nodes and for the final total cost optimization. The methodology in one embodiment may also address multi-objective optimization via comparable costs for different objectives, e.g., incorporate, predict, and trade-off between multiple different business objective costs and adjust to changing priorities FIG. 4 illustrates a schematic of an example computer or processing system that may implement an order management system or the computing environment in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of providing fulfillment source nodes using optimization performed in a computer environment comprising a shared pool of configurable computing resources, comprising:

provisioning a virtual machine on the computer environment;

executing a predictive engine on the computer environment running the virtual machine, to perform a predictive analysis on data pipelined into the computer environment, the data received from a plurality of sources and in a plurality of different formats, the predictive engine generating a network level cost information based on the predictive analysis on a dynamic and continuous basis, wherein the predictive engine is hosted on the computer environment allowing an on-demand network access to a shared pool of configurable computing resources, the computer environment supporting data infrastructure for receiving the data from a plurality of sources and in a plurality of different formats;

receiving, by one or more processors, an asynchronous communication from the predictive engine, the asynchronous communication comprising the network level cost information generated by the predictive engine dynamically, wherein one or more of the processors are configured remotely from the computer environment;

generating, by one or more of the processors, a set of candidate nodes for order fulfillment based on the network level cost information and a defined distance between the set of candidate nodes and a target destination;

executing an optimization engine on the computer environment, the optimization engine filtering the set of candidate nodes further based on the network level cost information;

receiving, by one or more of the processors, a synchronous communication from the optimization engine, the synchronous communication comprising a set of fulfillment nodes filtered from the set of candidate nodes;

executing, by one or more of the processors, a solver to select a threshold number of fulfillment nodes from the set of fulfillment nodes that meet one or more constraints, the threshold number being tunable and is tuned as to not overburden an on-premise system running the one or more processors, the on-premise system running the one or more processors interfaced with the computer environment via the data pipeline and call-outs from the one or more processors; and outputting the threshold number of fulfillment nodes.

2. The method of claim 1, wherein network level cost information comprises dynamic item cost at a node.

3. The method of claim 1, further comprising:
executing a shipping optimization on the computer environment, the shipping optimization further selecting one or more fulfillment nodes from the set of fulfillment nodes that incur least shipping cost;
receiving, by one or more of the processors, a synchronous communication from the shipping optimization, the synchronous communication comprising the one or more fulfillment nodes selected from the set of fulfillment nodes by the shipping optimization,
wherein the threshold number of fulfillment nodes is output from the one or more fulfillment nodes selected from the set of fulfillment nodes by the shipping optimization.

4. The method of claim 1, further comprising:
automatically directing the threshold number of fulfillment nodes to deliver order fulfillment to the target destination.

5. The method of claim 1, wherein the method is performed responsive to an order management system running on one or more of the processors receiving an order for fulfillment.

6. The method of claim 1, wherein the predictive engine is invoked via an application programming interface.

7. The method of claim 1, wherein the optimization engine is invoked via an application programming interface.

8. A computer readable storage medium storing a program of instructions executable by a machine to perform a method of providing fulfillment source nodes using optimization performed in a computer environment comprising a shared pool of configurable computing resources, the method comprising:

provisioning a virtual machine on the computer environment;

executing a predictive engine on the computer environment running the virtual machine, to perform a predictive analysis on data pipelined into the computer environment, the data received from a plurality of sources and in a plurality of different formats, the predictive engine generating a network level cost information based on the predictive analysis on a dynamic and continuous basis, wherein the predictive engine is hosted on the computer environment allowing an on-demand network access to a shared pool of configurable computing resources, the computer environment supporting data infrastructure for receiving the data from a plurality of sources and in a plurality of different formats;

receiving, by one or more processors, an asynchronous communication from the predictive engine, the asynchronous communication comprising the network level cost information generated by the predictive engine dynamically, wherein one or more of the processors are configured remotely from the computer environment;

generating, by one or more of the processors, a set of candidate nodes for order fulfillment based on the network level cost information and a defined distance between the set of candidate nodes and a target destination;

executing an optimization engine on the computer environment, the optimization engine filtering the set of candidate nodes further based on the network level cost information;

receiving, by one or more of the processors, a synchronous communication from the optimization engine, the synchronous communication comprising a set of fulfillment nodes filtered from the set of candidate nodes;

executing, by one or more of the processors, a solver to select a threshold number of fulfillment nodes from the set of fulfillment nodes that meet one or more constraints, the threshold number being tunable and is tuned as to not overburden an on-premise system running the one or more processors, the on-premise system running the one or more processors interfaced with the computer environment via the data pipeline and call-outs from the one or more processors; and outputting the threshold number of fulfillment nodes.

9. The computer readable storage medium of claim 8, wherein network level cost information comprises dynamic item cost at a node.

10. The computer readable storage medium of claim 8, further comprising:
executing a shipping optimization on the computer environment, the shipping optimization further selecting one or more fulfillment nodes from the set of fulfillment nodes that incur least shipping cost;
receiving, by one or more of the processors, a synchronous communication from the shipping optimization, the synchronous communication comprising the one or more fulfillment nodes selected from the set of fulfillment nodes by the shipping optimization,
wherein the threshold number of fulfillment nodes is output from the one or more fulfillment nodes selected from the set of fulfillment nodes by the shipping optimization.

11. The computer readable storage medium of claim 8, further comprising:
automatically directing the threshold number of fulfillment nodes to deliver order fulfillment to the target destination.

12. The computer readable storage medium of claim 8, wherein the method is performed responsive to an order management system running on one or more of the processors receiving an order for fulfillment.

13. The computer readable storage medium of claim 8, wherein the predictive engine is invoked via an application programming interface.

14. The computer readable storage medium of claim 8, wherein the optimization engine is invoked via an application programming interface.

15. A system of providing fulfillment source nodes using optimization performed in a computer environment comprising a shared pool of configurable computing resources, comprising:
one or more hardware processors having a network interface device;
one or more of the hardware processors operable to provision a virtual machine on the computer environment;
one or more of the hardware processors operable to invoke a predictive engine to execute on the computer environment running the virtual machine, the predictive engine performing a predictive analysis on data pipelined into the computer environment, the data received from a plurality of sources and in a plurality of different formats, the predictive engine generating a network level cost information based on the predictive analysis on a dynamic and continuous basis, wherein the predictive engine is hosted on the computer environment allowing an on-demand network access to a shared pool of configurable computing resources, the computer environment supporting data infrastructure for receiving the data from a plurality of sources and in a plurality of different formats,
one or more of the hardware processors further operable to receive an asynchronous communication from the predictive engine via the network interface device, the asynchronous communication comprising the network level cost information generated by the predictive engine dynamically, wherein one or more of the hardware processors are configured remotely from the computer environment,
one or more of the hardware processors further operable to generate a set of candidate nodes for order fulfillment based on the network level cost information and a defined distance between the set of candidate nodes and a target destination,
one or more of the hardware processors further operable to invoke an optimization engine to execute on the computer environment, the optimization engine filtering the set of candidate nodes further based on the network level cost information,
one or more of the hardware processors further operable to receive a synchronous communication from the optimization engine via the network interface device, the synchronous communication comprising a set of fulfillment nodes filtered from the set of candidate nodes;
one or more of the hardware processors further operable to execute a solver to select a threshold number of fulfillment nodes from the set of fulfillment nodes that meet one or more constraints, the threshold number being tunable and is tuned as to not overburden an on-premise system running the one or more processors, the on-premise system running the one or more processors interfaced with the computer environment via the data pipeline and call-outs from the one or more processors, and
one or more of the hardware processors further operable to output the threshold number of fulfillment nodes.

16. The system of claim 15, wherein network level cost information comprises dynamic item cost at a node.

17. The system of claim 15, wherein one or more of the hardware processors are further operable to execute a shipping optimization on the computer environment, the shipping optimization further selecting one or more fulfillment nodes from the set of fulfillment nodes that incur least shipping cost, wherein one or more of the hardware processors are further operable to receive a synchronous communication from the shipping optimization, the synchronous communication comprising the one or more fulfillment nodes selected from the set of fulfillment nodes by the shipping optimization, wherein the threshold number of fulfillment nodes is output from the one or more fulfillment nodes selected from the set of fulfillment nodes by the shipping optimization.

18. The system of claim 15, wherein one or more of the hardware processors are further operable to automatically directing the threshold number of fulfillment nodes to deliver order fulfillment to the target destination.

19. The system of claim 15, wherein the predictive engine is invoked via an application programming interface.

20. The system of claim 15, wherein the optimization engine is invoked via an application programming interface.

* * * * *